(12) United States Patent
Vaatveit

(10) Patent No.: US 7,647,181 B2
(45) Date of Patent: Jan. 12, 2010

(54) COMPUTER GENERATED LAND COVER CLASSIFICATION

(75) Inventor: Eugene J. Vaatveit, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 923 days.

(21) Appl. No.: 11/203,679

(22) Filed: Aug. 12, 2005

(65) Prior Publication Data

US 2007/0047820 A1 Mar. 1, 2007

(51) Int. Cl.
*G01V 3/38* (2006.01)
(52) U.S. Cl. .......................... 702/5; 434/150
(58) Field of Classification Search ............. 702/5
See application file for complete search history.

(56) References Cited

U.S. PATENT DOCUMENTS

2003/0018431 A1* 1/2003 Hanson ................... 702/5
2004/0117777 A1* 6/2004 Lichana .................. 717/151

OTHER PUBLICATIONS

SimCity 2000 Manual, Maxis Software corporation 1994.*

* cited by examiner

*Primary Examiner*—Bryan Bui
*Assistant Examiner*—Jonathan Teixeira Moffat
(74) *Attorney, Agent, or Firm*—Perkins Coie LLP

(57) ABSTRACT

A method and system for generating land cover classifications is provided. Embodiments of the invention are directed toward a method in a computing environment for determining land cover classification that includes identifying a geographic unit and determining a human presence datum corresponding to the geographic unit. The method can further include determining an environmental datum corresponding to the geographic unit and/or a cultural datum corresponding to the geographic unit. The method can still further include assigning a land cover classification to the geographic unit based on at least the human presence datum and (a) the environmental datum, (b) the cultural datum, or (c) both (a) and (b). In certain embodiments, the method can still further include determining a geographic region corresponding to the geographic unit and assigning a land cover classification to the geographic unit based on at least the geographic region.

20 Claims, 4 Drawing Sheets

202 — Identify geographic unit

204 — Determine geographic region

206 — Determine human presence datum

208 — Determine environmental datum and/or cultural datum

210 — Assign land cover classification

212 — Store the assigned land cover classification

*FIG. 2*

If the corresponding geographic region is the United States:

If the percent impervious surface is less than A then output null ⸺ 302

Else if the percent impervious surface is A or greater but less than B ⸺ 304

If part of a large city then output "Large City Suburban Grid Wet/Dry" ⸺ 306
        Else if part of a medium city then output "Medium City Suburban Grid Wet/Dry" ⸺ 308
        Else output "Small City Suburban Grid Wet/Dry" ⸺ 310

Else if the percent impervious surface is B or greater, but less than C ⸺ 312

If part of a large city output then "Large City Urban Grid Wet/Dry" ⸺ 314
        Else if part of a medium city then output "Medium City Urban Grid Wet/Dry" ⸺ 316
        Else output "Small City Urban Grid Wet/Dry" ⸺ 318

Else if part of a large city then output "Large City Highrise" ⸺ 320

Else output "Medium City Urban Grid Wet/Dry" ⸺ 322

*FIG. 3*

If the corresponding geographic region is Europe:

If not a large or medium city and sprawl factor is less than D then output null ⸺ 402

Else if not a large or medium city output "Small City Suburban Non-Grid Wet/Dry" ⸺ 404

Else if not a large city output "Medium City Suburban Non-Grid Wet/Dry" ⸺ 406

Else if normalized density is greater than or equal to D output "Large City Highrise" ⸺ 408

Else output "Large City Urban Non-Grid Wet/Dry" ⸺ 410

*FIG. 4*

If the corresponding region is not the United States or Europe:

If not in sprawl mask and not a large or medium city output null ⸺ 502

Else if not a large or medium city output "Small City Suburban Non-Grid Wet/Dry" ⸺ 504

Else if not a large city output "Medium City Urban Non-Grid Wet/Dry" ⸺ 506

Else if not highrise output "Large City Urban Non-Grid Wet/Dry" ⸺ 508

Else output "Large City Highrise" ⸺ 510

*FIG. 5*

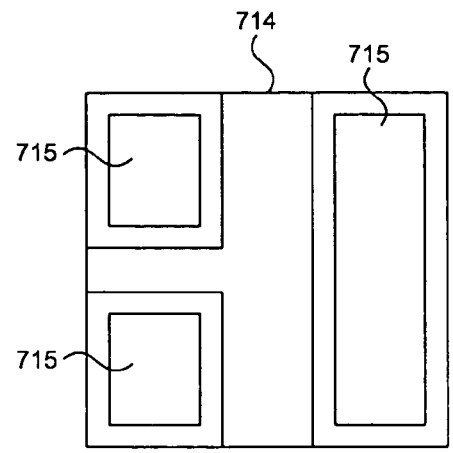
|   |   |   |   |
|---|---|---|---|
| L | L | L | W |
| L | L | L | W |
| L | L | L | W |
| L | L | L | W |
*FIG. 6*
*FIG. 7*
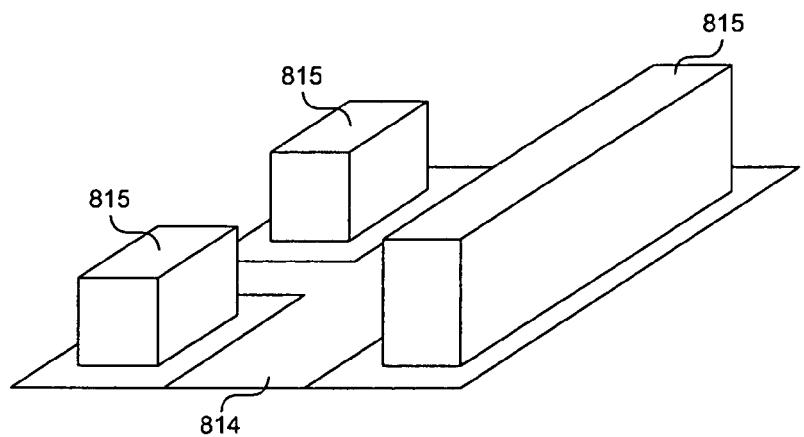
*FIG. 8*

COMPUTER GENERATED LAND COVER CLASSIFICATION

BACKGROUND

Various computer applications use databases that contain data representing human settlements that are distributed over certain portions of land. For example, various games use data representing human settlements to generate a portion of the environment in which the game is played. Other computer applications that use data representing the distribution of human settlements include simulators (e.g., flight simulators and/or combat simulators), which use the data to provide a realistic simulation environment.

Current databases generally do not realistically represent areas covered by human settlements. In the real world, human settlements can vary significantly from place to place. For examples, human settlements can take the form of sparsely populated areas, small towns, suburban sprawl, dense urban areas, and downtown high-rise districts, to name but a few. In contrast, many current human settlements databases generally characterize areas as simply urban or non-urban.

This binary classification can prevent urban areas having different types of human settlement from being realistically presented. For example, a medium size city can have a distinctly different general appearance than a downtown high-rise district. Additionally, this binary classification provides an unrealistic transition between various areas having different degrees or levels of human settlement and/or between urban and non-urban areas. For example, downtown highrise districts are often surrounded by suburban sprawl, both of which have distinctly different general appearances. Furthermore, urban areas in different parts of the world tend to develop differently based on cultural and environmental factors. Again, this binary classification fails to represent these differences. Accordingly, current databases often do not provide the accuracy or the fidelity that is desired for various computer applications.

SUMMARY

A method and system for generating land cover classifications is provided. For example, a computer implemented method can include identifying a geographic unit representing a portion of the world and determining a human presence datum corresponding to the geographic unit. An environmental datum corresponding to the geographic unit and/or a cultural datum corresponding to the geographic unit can also be determined. A land cover classification can be assigned to the geographic unit based, at least in part, on the human presence datum and (a) the environmental datum, (b) the cultural datum, or (c) both (a) and (b). This process can be performed for multiple geographic units to provide a database of geographic units with assigned land cover classifications. Because the land cover classifications are based on multiple types of data, in certain situations, the land cover classifications can be used to create more realistic visual scenes in various computer games and simulations than can be done with current databases.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is a flow diagram that illustrates a process for determining a land cover classification in accordance with embodiments of the invention.

FIG. 3 is a portion of a process for determining a land cover classification in accordance with certain embodiments of the invention.

FIG. 4 is a portion of a process for determining a land cover classification in accordance with other embodiments of the invention.

FIG. 5 is a portion of a process for determining a land cover classification in accordance with still other embodiments of the invention.

FIG. 6 is a partially schematically illustration of multiple geographic units in accordance with various embodiments of the invention.

FIG. 7 is a partially schematically illustration of a single geographic unit with a two-dimensional visual representation of land cover associated with the land cover classification assigned to the geographic unit in accordance with embodiments of the invention.

FIG. 8 is a partially schematically illustration of a single geographic unit with a three-dimensional visual representation of land cover associated with the land cover classification assigned to the geographic unit in accordance with embodiments of the invention.

DETAILED DESCRIPTION

Figure 1:
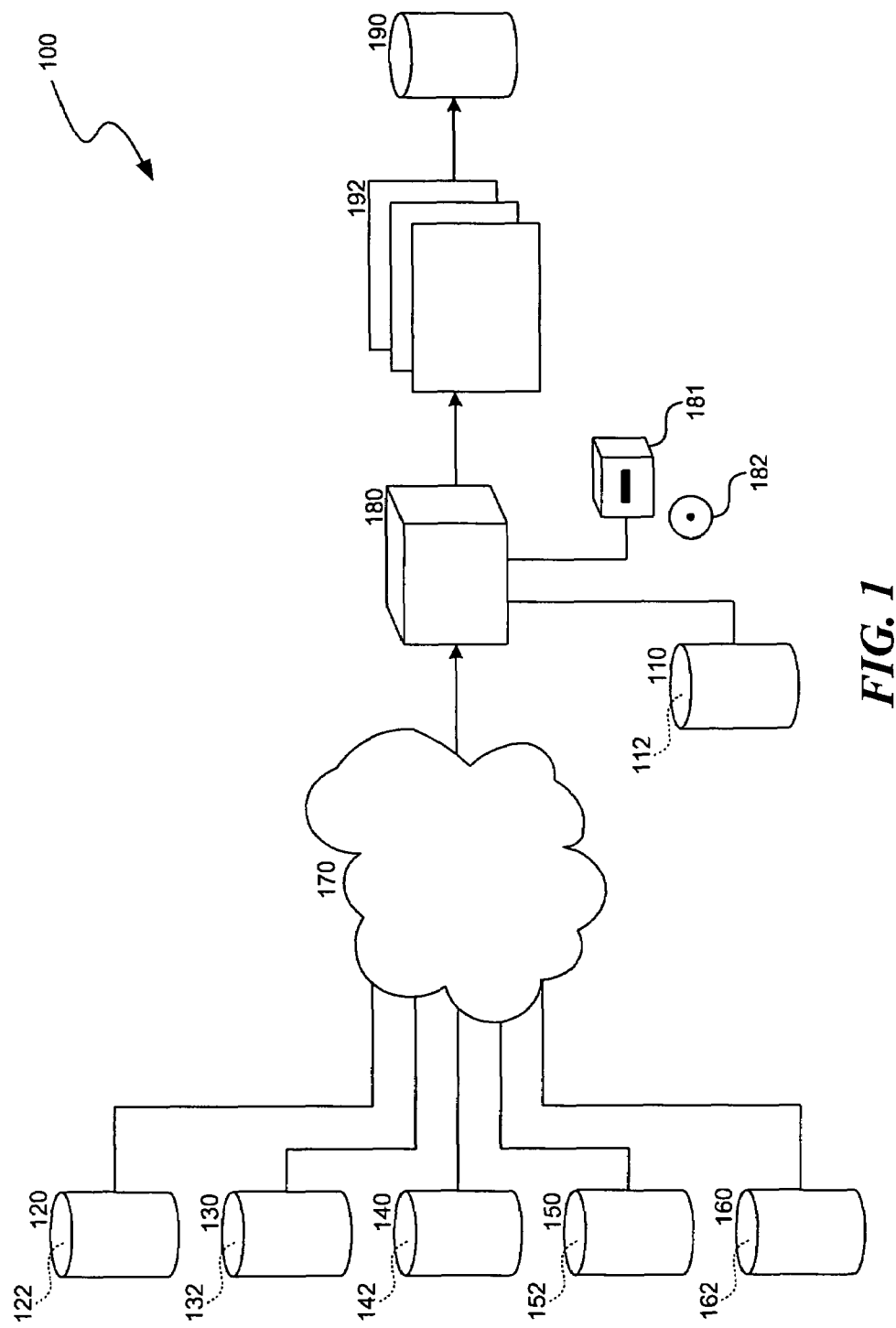
FIG. 1 is a block diagram that illustrates a computing environment suitable for determining a land cover classification in accordance with embodiments of the invention.

A method and system for generating land cover classifications is provided. Embodiments of the invention are directed toward a method in a computing environment for determining land cover classification that includes identifying a geographic unit and determining a human presence datum corresponding to the geographic unit. The method can further include determining an environmental datum corresponding to the geographic unit and/or a cultural datum corresponding to the geographic unit. The method can still further include assigning a land cover classification to the geographic unit based on at least the human presence datum and (A) the environmental datum: (b) the cultural datum, or (c) both (a) and (b). In certain embodiments, the method can still further include determining a geographic region corresponding to the geographic unit and assigning a land cover classification to the geographic unit based on at least the geographic region. Other embodiments of the invention are directed toward a computer-readable medium containing instructions for controlling a computing environment to perform portions of the methods described above. Still other embodiments of the invention are directed toward a computer-readable medium containing a dataset of land cover classifications associated with multiple geographic units, where the dataset has been produced using portions of the methods described above.

FIG. 1 is a block diagram that illustrates a computing environment 100 suitable for determining a land cover classification in accordance with embodiments of the invention. The computing environment 100 can include a computer system 180 that can communicate with one or more databases. For example, in the illustrated embodiment the computer system 180 can communicate via a network 170 (e.g., the Internet) with a geographic region database 120, a human presence database 130, an environmental database 140, a cultural database 150, and one or more additional databases 160. The computer system 180 can also communicate with a geographic database 110 and a land cover classification database 190. The computer system 180 can also include a device 181 for reading data from, or storing data to, a computer readable medium 182. In other embodiments, the computing environment 100 can have other arrangements, including more, fewer, and/or different components.

For example, the computing device or environment on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

FIG. 2 is a flow diagram that illustrates a process for determining a land cover classification in accordance with embodiments of the invention. A geographic unit 112 (e.g., an area on the surface of the earth) can be identified (process portion 202). For example, a geographic unit 112 can be selected from the geographic database 110 shown in FIG. 1. A geographic region 122 corresponding to the geographic unit 112 can be determined using the geographic region database 120 shown in FIG. 1 (process portion 204). A human presence datum 132 corresponding to the geographic unit 112 can be determined using the human presence database 130 shown in FIG. 1 (process portion 206). An environmental datum 142 corresponding to the geographic unit 112 can be determined from the environmental database 140 shown in FIG. 1 and/or a cultural datum 152 corresponding to the geographic unit 112 can be determined using the cultural database 150 shown in FIG. 1 (process portion 208). A land cover classification 192 can be assigned to the geographic unit 112 based on at least the human presence datum and (a) the environmental data 142, (b) the cultural data 152, or (c) both (a) and (b) (process portion 210). The land cover classification 192 assigned to the geographic unit 112 can then be stored (process portion 212), for example, on a computer readable medium and/or in a database. The process can be repeated to generate land cover classifications for multiple geographic units. Accordingly, a database or dataset of geographic units 112 with assigned land cover classifications can be produced.

A land cover classification 192 or a human generated land cover classification can be a classification representing the general expected, computed, or predicted attributes of the land cover or human generated land cover (e.g., cultivated fields, man-made items, roads, buildings) associated with the surface of the earth represented by a geographic unit 112. These attributes can include a visually distinct representation of land cover, for example, the expected types of roads, the expected types of buildings, the expected type and size of spaces between buildings, and the type of vegetation (if any) in those spaces. However, in contrast to a picture or photograph that shows the specific land cover (e.g., the actual placement of roads and buildings) on a specific piece of land, land cover classifications 192 provide general attributes that are applicable to each geographic unit having the same classification. Accordingly, a designer can use land cover classifications 192 to construct (e.g., generate by computer or assign various imagery) realistic visual scenery having the general attributes associated with the classification assigned to various geographic units.

The human presence datum 132 discussed above with reference to FIG. 2 can include a datum reflecting population density or a datum reflecting a level of human impact. For example, human presence data 132 can include Nighttime Lights of the World, available from NOAA of the United States Government. Nighttime Lights provides a normalized amount of radiance typical of various locations throughout the world, which can be an indication of the human presence in those locations. Additionally, human presence data 132 can include Urban Area and Urban Clusters Census data, available from the United States Department of Commerce or from the Environmental Systems Research Institute (ESRI) of Redland Calif. The Urban Area and Urban Cluster data provides urbanized polygons that are used to delineate medium and large cities in the United States. Human presence data 132 can also include Europe Urbanized Areas and Europe Populated Places data, available from ESRI. The Europe Urbanized Areas and Europe Populated Places data provides polygons that meet selected population thresholds.

Furthermore, human presence data 132 can include Populated Place Points data, available from ESRI. Population Place Points data provides points of population. Human presence data 132 can also include the Global Human Foot Print Dataset, available from Columbia University of Palisades, N.Y. The Human Foot Print Dataset provides information regarding the amount (using a numeric scale) of human impact on various portions of land (e.g., farming a piece of land and/or building a structure on a piece of land). In still other embodiments, human presence data 132 can include Impervious Surface Area of the United States data, available from NOAA, of the United States Government. The Impervious Surface Area data provides a percentage of man-made cover in a selected area. In certain embodiments, human presence data 132 can include Global Land Cover Characteristics data, available from the USGS Land Processes Distributed Active Archive Center of the United States Government. Global Land Cover data provides a binary urban area classification for selected areas of the world (e.g., urban or non-urban).

The environmental datum 142, discussed above with reference to FIG. 2 can include a datum reflecting climatic conditions, ecological conditions, or biometric conditions. These conditions can influence how various areas are developed. For example, urban areas located in wet regions of the world often tend to grow around obstacles (e.g., hills, trees, parks, etc), often in irregular patterns, and tend to include high population densities. In contrast, urban areas that develop in dry areas where there are few obstacles tend to develop in a more regular (e.g., rectangular) fashion. Additionally, urban areas in dry regions tend to be more spread out and tend to have lower population densities. In certain embodiments, environmental data 142 can include World Wildlife Fund Terrestrial Ecoregions data, available from ESRI. The Terrestrial Ecoregion data includes information regarding whether various regions of the world tend to be wet or dry.

The cultural datum 152 includes a datum reflecting urban growth patterns typical of a cultural area or region of the world. For example, in the United States urban areas tend to develop in a grid pattern, with the population tending to be more spread out (e.g., a large number of residences are located around the cities and urban areas). In other parts of the world, urban areas tend develop in a non-grid pattern with a high concentration of residences being located toward the center of the cities or urban areas.

The geographic region database 120 can include information based on various world atlas databases. For example, in one embodiment the geographic region 122 can be determined by matching the selected geographic unit 112 with a world atlas or other database to determine the region of the world where the geographic unit 112 is located. In certain embodiments, the geographic region database 120 can include World Countries data, available from ESRI.

In certain embodiments, additional data can also be used in determining the land cover classification 192 of a selected geographic unit 112. For example, the process discussed in FIG. 2 can further include determining an additional datum 162 (shown in FIG. 1) and assigning a land cover classification 192 to a selected geographic unit based at least in part on the additional datum 162. In selected embodiment, the additional datum 162 can include an additional human presence datum, and an additional environmental datum, and/or an additional cultural datum. In other embodiments, the additional datum 162 can include another type of data. For example, the additional data 162 can include Snow and Ice Cover data, which provides the location of the northern polar ice cap. The Snow and Ice Cover data is available from ESRI.

Many of the various databases (e.g., those containing geographic units 112, geographic region data 122, human presence data 132, environmental data 142, cultural data 152, and additional data 162) use different coordinate systems and contain data having different cell sizes and shapes and cell registration schemes. For example, some databases contain point data while other databases contain polygons. Accordingly, the process of determining a datum corresponding to the geographic unit 112 can include transforming the information contained in the database into a coordinate system, a cell size, and having a cell registration scheme compatible with the geographic unit 112. Any of a variety of methods, well known in the art, can be used to make these transformations.

The process of identifying a geographic unit 112 can also include various methods. For example, in certain embodiments the geographic unit 112 can be selected by a user from a database or entered/defined by a user real time. In other embodiments, the geographic unit 112 can be selected by the computer system 180 from the geographic database 110. In still other embodiments, the geographic unit 112 can be identified by selecting a datum from one of the other databases (e.g., those containing geographic units 112, geographic region data 122, human presence data 132, environmental data 142, cultural data 152, and additional data 162) and using the cell or surface area associated with the selected datum point as the geographic unit 112. Accordingly, in selected embodiments the determination of land cover classification can be used to enhance an existing database.

FIGS. 3-5 discuss certain embodiments of the invention that can be used to provide land cover classifications for various regions of the world. More particularly, FIG. 3 is a portion of a process for determining a land cover classification for the United States, in accordance with certain embodiments of the invention. Various Urban Area and Urban Cluster Census data cells can be used to identify the geographic units. If the population associated with a geographic unit has a value greater than a first selected value (e.g., 1,000,000) the unit can be associated with a large city (e.g., labeled or identified as being associated with a large city). If the population associated with a geographic unit has a value less than the first selected value, but greater than a second value (e.g., 100,000) the unit can be associated with a medium sized city. Impervious Surface Area data and the Terrestrial Ecoregions data can be transformed to have a common coordinate system, cell size, and registration scheme as the geographic units. Accordingly, each geographic unit will have a percentage of impervious surface area and will be classified as wet or dry. All geographic units in the United States can be classified as grid indicating that urban areas tend to develop in the grid pattern discussed above.

The process shown in FIG. 3 can then be used to output and assign the land cover classification to each geographic unit. The process determines whether the percent impervious surface is less than A (e.g., less than 4). If it is, then the output is null, representing a non-urban area land cover classification (process portion 302). If not, the process determines whether the percent impervious surface is A or greater, but less than B, for example, where B is 31 (process portion 304). If it is, then depending on the wet/dry classification of the geographic unit, the output is (a) "Large City Suburban Grid Wet/Dry" if the geographic unit is associated with a large city (process portion 306); (b) "Medium City Suburban Grid Wet/Dry" if the geographic unit is associated with a medium city (process portion 308); or (c) "Small City Suburban Grid Wet/Dry" if the conditions in (a) or (b) are not met (process portion 310).

If the percent impervious surface is not between A and B, the process determines whether the percent impervious surface is B or greater, but less than C, for example, where C is 66 (process portion 312). If it is, then the output is (a) "Large City Urban Grid Wet/Dry" if the geographic unit is associated with a large city (process portion 314); (b) "Medium City Urban Grid Wet/Dry" if the geographic unit is associated with a medium city (process portion 316); or (c) "Small City Urban Grid Wet/Dry" if the conditions in (a) or (b) are not met (process portion 318). Otherwise, if the percent impervious surface is C or greater, the output is (a) "Large City Highrise" if the geographic unit is associated with a large city (process portion 320); or (b) "Medium City Urban Grid Wet/Dry" if the geographic unit is not associated with a large city (process portion 322).

FIG. 4 is a portion of a process for determining a land cover classification in Europe, in accordance with certain embodiments of the invention. Various Europe Urbanized Areas and Europe Populated Places cells can be used to identify geographic units. Unlike the United States' Urban Area and Urban Cluster data, the Europe Urbanized Areas and Populated Places data only categorize each cell or geographic unit as being urban or non-urban. Each geographic unit having an urban categorization can be associated with a large or medium city based on the number of geographic units forming a contiguous cluster, where each urban categorized geographic unit in the cluster has at least a portion touching another urban categorized geographic unit to form a continuous cluster. Urban categorized geographic units that are part of a cluster with more than a certain number of urban categorized geographic units (e.g., 750) can be associated with a large city and the rest of the urban categorized geographic units can be associated with a medium city. In certain embodiments, during this process a buffer of non-urban categorized geographic unit can be assigned an urban category to insure that the clusters do not shrink during data manipulation (e.g., downsampling).

Populated Place Points data provides points of population, but do not provide the area associated with the specified population. Accordingly, Population Place Points data can be assigned a radius (e.g., the radius can be determined by the magnitude of the point population and/or regional norms) and a population distribution around the point can be approximated using a quadratic kernel function. A population distribution can then be determined for the corresponding geographic units (e.g., the corresponding urban categorized geographic units). The urban categorized geographic units with the population data can then be used to determine the area of highest population density within each cluster. This density value can be normalized so that the most dense area of a particular cluster has a value of 100.

The Global Human Footprint Dataset includes values from 0 to 100 representing the degree of human impact upon the land. The Human Footprint Data can be added to the normalized population density value for each urban categorized geographic unit to provide a sprawl factor (e.g., a measure of population density and human impact on the land). The process in FIG. 4 can then be used to output and assign the land cover classification to each geographic unit. If the geographic unit is not associated with a large or medium city and sprawl factor is less than D (e.g., 60), the process outputs a null value indicating a non-urban area land cover classification (process portion 402). If this condition is not met, the process determines whether the geographic unit is associated with a large or medium city, and if it is not, then the process outputs "Small City Suburban Non-Grid Wet/Dry" (process portion 404). If this condition is not met, the process determines if the geographic unit is associated with a large city, and if it is not, then the process outputs "Medium City Suburban Non-Grid Wet/Dry" (process portion 406). If this condition is not met, the process determines if the normalized density associated with the geographic unit is greater than or equal to D, if it is, then the process outputs "Large City Highrise" (process portion 408). Otherwise, the process outputs "Large City Urban Non-Grid Wet/Dry" (process portion 410).

FIG. 5 is a portion of a process for determining a land cover classification for areas of the world other than the United States and Europe, in accordance with certain embodiments of the invention. Various cells from the Global Land Cover Characteristics Dataset can be used to identify geographic units for areas outside of the United States and Europe. The data for each of the cells in the Land Cover Dataset provides only a binary categorization of urban or non-urban. Accordingly, a similar process as described above with reference to the Europe Urbanized Areas and Europe Populated Places data is used to associate urban categorized geographic units with large cities or a medium cities. The Nighttime Lights of the World data consists of a surface with values being the normalized amount of radiance in a particular location. Geographic units that fall within an area having a normalized amount of radiance greater than or equal 80 can be associated with sprawl.

The Population Place Point data is used differently outside of the United States and Europe. If a population place point is located in a large city cluster as determined using the Global Land Cover Characteristics Dataset, a buffer is formed around the areas (e.g., by adding a six pixel randomizing ring) to form a highrise area within the cluster and the corresponding geographic units are associated with the highrise area. The process in FIG. 5 can then be used to output and assign the land cover classification to each geographic unit. If the geographic unit is not associated with sprawl and not associated with a large or medium city the process outputs a null value indicating a non-urban area land cover classification (process portion 502). If this condition is not met, the process determines if the geographic unit is associated with a large or medium city, if it is not, then the process outputs "Small City Suburban Non-Grid Wet/Dry" (process portion 504). If this condition is not met, the process determines if the geographic unit is associated with a large city, and if it is not, the process outputs "Medium City Urban Non-Grid Wet/Dry" (process portion 506). If this condition is not met, the process determines if the geographic unit is associated with a highrise area, and if it is not the process outputs "Large City Urban Non-Grid Wet/Dry" (process portion 508). Otherwise, the process outputs "Large City Highrise" (process portion 510).

The geographic units with assigned land cover classifications from the processes discussed above with reference to FIGS. 3-5 can be combined to provide a database covering the United States, Europe, and other areas of the world. For example, the geographic units identified for the United States and Europe, with their assigned land cover classification, can be merged into the Global Land Cover Characteristics database (e.g., overwriting or replacing the existing data) to produce a worldwide dataset of geographic units with assigned land cover classifications. To further enhance the database and make it more useable for building visual scenery, the northern polar ice cap can be merged into the worldwide dataset (e.g., various geographic units can be assigned an ice cap classification).

Additionally, in certain embodiments a land cover classification can be determined for a second geographic unit based, at least in part, on the land cover classification assigned to a first geographic unit. For example, in order to provide smooth transitions between merged datasets, the land cover classification of a first geographic unit may be used to influence the land cover classification of a second geographic unit. In other embodiments, a land cover classification for geographic unit that represent water (e.g., represent a surface on a body of water) may be determined by assigning the land cover classification of proximate geographic unit(s) representing land.

For example, FIG. 6 is a partially schematically illustration of multiple geographic units. The geographic units labeled L represent land and the geographic units labeled W represent water. Accordingly, the land cover classification assigned to one or more of the geographic units representing land can be used, at least in part, to determine the land cover classification of a geographic unit representing water. This feature can be useful for building a visual scenery of an area along a coastline where there may be small islands and/or areas of the coastline that are not represented as land in the database used to assign land cover classifications. For example, when the geographic units with the land cover classifications are merged with a database that includes these islands and/or coastline areas (e.g., a database with a smaller cell size), the land cover classification of the geographic unit that overlay these islands and/or coastline areas can be attributed to the land portion of the island and coastline areas, even though the geographic unit represents water. This can allow a designer to create a realistic visual scene.

There are many methods that can be used to determine which geographic unit representing land will influence the land cover classification of a geographic unit representing water. For example, in certain embodiments the land cover classification of the majority of geographic units in a cluster of geographic units can be used to determine the land cover classification for all geographic units representing water within a certain distance of the cluster (e.g., within half the radius of the cluster). When a geographic unit representing water is located within the specified distance of two or more clusters, the land cover classification of the majority of geographic units in the largest cluster can be assigned to the geographic unit representing water. In other embodiments, the land cover classification of the nearest geographic unit representing land can be used to determine (e.g., assign to) a geographic unit representing water.

A feature of some of the embodiments discussed above is that land cover classifications based on multiple databases can be assigned to geographic units, providing higher fidelity in assigning the classifications and/or more discrete classification levels. Additionally, each land cover classification can be representative of a two-dimensional and/or a three-dimensional visually distinct representation of land cover associated with the land cover classification. For example, FIG. 7 schematically shows a two-dimensional representation of land cover having various features (e.g., streets 714 and buildings 715) and FIG. 8 schematically shows a three-dimensional representation of land cover having various features (e.g., streets 814 and buildings 815). In other embodiments, the visually distinct representations shown in FIGS. 7 and 8 can have more, fewer, and/or different features. These land cover classifications derived from multiple databases and assigned to geographic units can provide designers with the ability to provide more realistic land cover representations in various computer games and simulations than can be done with current databases.

From the foregoing, it will be appreciated that specific embodiments of the invention have been described herein for purposes of illustration, but that various modifications may be made without deviating from the invention. Additionally, aspects of the invention described in the context of particular embodiments may be combined or eliminated in other embodiments. For example, although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

I claim:

1. A method in a computing environment for determining land cover classification, the method comprising:

identifying, by a computing system having a processor and memory, multiple geographic units, wherein each of the geographic units corresponds to one of multiple areas on the surface of the earth;

for each of the multiple geographic units:
  determining, by the computing system, a human presence datum that is an indication of human occupancy on the corresponding area on the surface of the earth;
  determining, by the computing system, at least one of an environmental datum that is an indication of an environmental aspect of the corresponding area on the surface of the earth, and a cultural datum that is an indication of a cultural aspect of the corresponding area on the surface of the earth;
  assigning, by the computing system, a land cover classification to the geographic unit based on at least the human presence datum and (a) the environmental datum, (b) the cultural datum, or (c) both (a) and (b);

storing, by the computing system, the assigned land cover classifications in association with the multiple geographic units.

2. The method of claim 1 wherein assigning a land cover classification includes assigning a classification representing at least one of a two-dimensional visually distinct representation of land cover associated with the land cover classification and a three-dimensional visually distinct representation of land cover associated with the land cover classification.

3. The method of claim 1 wherein:
determining a human presence datum includes determining a human presence datum that is an indication of human population density on the corresponding area on the surface of the earth; and
determining at least one of an environmental datum and a cultural datum includes determining at least one of an environmental datum that is an indication of climatic conditions, ecological conditions, or biometric conditions of the corresponding area on the surface of the earth and a cultural datum that is an indication of urban growth patterns typical of a cultural area of the corresponding area on the surface of the earth.

4. The method of claim 1 wherein the multiple geographic units includes first and second geographic units and the assigned land cover classifications includes first and second land cover classifications, and wherein the method further comprises assigning the second land cover classification to the second geographic unit based on at least the first land cover classification assigned to the first geographic unit.

5. The method of claim 1 wherein:
the human presence datum is a first human presence datum that is a first indication of human occupancy on the corresponding area on the surface of the earth;
the environmental datum is a first environmental datum that is a first indication of an environmental aspect of the corresponding area on the surface of the earth;
the cultural datum is a first cultural datum that is a first indication of a cultural aspect of the corresponding area on the surface of the earth, and wherein the method further comprises:
determining at least one of a second human presence datum that is a second indication of human occupancy on the corresponding area on the surface of the earth, a second environmental datum that is a second indication of an environmental aspect of the corresponding area on the surface of the earth, and a second cultural datum that is a second indication of a cultural aspect of the corresponding area on the surface of the earth, and wherein assigning a land cover classification includes assigning a land cover classification to the geographic unit based on at least one of the second human presence datum, the second environmental datum, and the second cultural datum.

6. The method of claim 1, further comprising:
determining a geographic region of the earth corresponding to the geographic unit; and
assigning a land cover classification to the geographic unit based on at least the geographic region.

7. The method of claim 1, wherein, for at least some of the multiple geographic units:

the human presence datum is an indication of a population on the corresponding area on the surface of the earth;

the environmental data is an indication of a percentage of an impervious surface area of the corresponding area on the surface of the earth; and for at least some of the multiple geographic units, assigning a land cover classification to the geographic unit includes assigning a land cover classification that includes:

one of a non-urban area classification, a suburban area classification, an urban area classification, and a highrise area classification; and one of a small city classification, a medium city classification, a large city classification, and no city classification.

8. The method of claim 1, wherein, for each of at least a first set of geographic units corresponding to contiguous areas on the surface of the earth:

the human presence datum indicates whether the corresponding area on the surface of the earth is an urban area or a non-urban area; and assigning a land cover classification to the geographic unit includes assigning an urban land cover classification upon reaching a threshold number of geographic units for which the human presence data indicates that the corresponding areas are urban areas.

9. A computer-readable medium containing instructions for controlling a computing environment to perform a method, the method comprising:

identifying a geographic unit, wherein the geographic unit corresponds to an area of the earth;

determining a human presence datum that indicates human occupancy information associated with the area of the earth;

determining at least one of an environmental datum that indicates environmental information associated with the area of the earth and a cultural datum that indicates cultural information associated with the area of the earth; and assigning, by a computing system having a processor and memory, a land cover classification to the geographic unit based on at least the human presence datum and (a) the environmental datum, (b) the cultural datum, or (c) both (a) and (b).

10. The computer-readable medium of claim 9 wherein assigning a land cover classification includes assigning a classification representing at least one of a two-dimensional visually distinct representation of land cover associated with the land cover classification and a three-dimensional visually distinct representation of land cover associated with the land cover classification.

11. The computer-readable medium of claim 9 wherein:

determining a human presence datum includes determining a human presence datum that indicates population density or level of human impact associated with the area of the earth; and determining at least one of an environmental datum and a cultural datum includes determining at least one of an environmental datum that indicates climatic conditions, ecological conditions, or biometric conditions associated with the area of the earth and a cultural datum that indicates urban growth patterns typical of a cultural area associated with the area of the earth.

12. The computer-readable medium of claim 9 wherein the geographic unit includes a first geographic unit and the land cover classification includes a first land cover classification and wherein the method further comprises assigning a second land cover classification to a second geographic unit based on at least the first land cover classification of the first geographic unit.

13. The computer-readable medium of claim 9 wherein:

the human presence datum is a first human presence datum that indicates first human occupancy information associated with the area of the earth;

the environmental datum is a first environmental datum that indicates first environmental information associated with the area of the earth; and the cultural datum is a first cultural datum that indicates first cultural information associated with the area of the earth, and wherein the method further comprises:

determining at least one of a second human presence datum that indicates second human occupancy information associated with the area of the earth, a second environmental datum that indicates second environmental information associated with the area of the earth, and a second cultural datum that indicates second cultural information associated with the area of the earth, and wherein assigning a land cover classification includes assigning a land cover classification to the geographic unit based on at least one of the second human presence datum, the second environmental datum, and the second cultural datum.

14. The computer-readable medium of claim 9 wherein identifying a geographic unit includes identifying a first geographic unit corresponding to a first area of the earth, determining a human presence datum includes determining a first human presence datum that indicates first human occupancy information associated with the first area of the earth, determining at least one of an environmental datum and a cultural datum includes determining at least one of a first environmental datum that indicates first environmental information associated with the first area of the earth and a first cultural datum that indicates first cultural information associated with the first area of the earth, assigning a land cover classification includes assigning a first land cover classification, and wherein the method further comprises:

identifying a second geographic unit, wherein the second geographic unit corresponds to a second area on the earth;

determining a second human presence datum that indicates second human occupancy information associated with the second area of the earth;

determining at least one of a second environmental datum that indicates second environmental information associated with the area of the earth and a second cultural datum that indicates second cultural information associated with the second area of the earth; and assigning, by the computing system, a second land cover classification to the second geographic unit based on at least the second human presence datum and (a) the second environmental datum, (b) the second cultural datum, or (c) both (a) and (b).

15. The computer-readable medium of claim 9 wherein the method further comprises storing the land cover classification assigned to the geographic unit.

16. The computer-readable medium of claim 9 wherein the method further comprises:

determining a geographic region of the earth corresponding to the geographic unit; and assigning a land cover classification to the geographic unit based on at least the geographic region.

17. A computing device having a processor and memory configured to perform a method, the method comprising:

Identifying multiple geographic units, each of the multiple geographic units representing a portion of the world; and for each of the multiple geographic units:

determining a human presence datum that indicates human occupancy on the portion of the world;

determining at least one of an environmental datum that indicates an environment condition associated with the portion of the world and a cultural datum that indicates a growth pattern associated with the portion of the world; and assigning, by the computing device, a land cover classification to the geographic unit based on at least the determined human presence datum and (a) the determined environmental datum, (b) the determined cultural datum, or (c) both (a) and (b).

18. The computing device of claim 17 wherein assigning a land cover classification includes assigning a land cover classification to each of the geographic unit, wherein the land cover classifications represent at least one of a two-dimensional visually distinct representation of land cover and a three-dimensional visually distinct representation of land cover.

19. The computing device of claim 17 wherein:

determining a human presence datum includes determining a human presence datum that indicates population density or level of human impact on the portion of the world; and determining at least one of an environmental datum and a cultural datum includes determining at least one of an environmental datum that indicates climatic conditions, ecological conditions, or biometric conditions associated with the portion of the world and a cultural datum that indicates urban growth patterns typical of a cultural area associated with the portion of the world.

20. The computing device of claim 17 wherein identifying multiple geographic units includes identifying multiple first geographic units and wherein the method further comprises assigning a land cover classification to a second geographic unit based on at least the land cover classification assigned to one of the first geographic units.

* * * * *

UNITED STATES PATENT AND TRADEMARK OFFICE
CERTIFICATE OF CORRECTION

PATENT NO. : 7,647,181 B2 Page 1 of 1
APPLICATION NO. : 11/203679
DATED : January 12, 2010
INVENTOR(S) : Eugene J. Vaatveit It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1188 days.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,647,181 B2 | Page 1 of 1 |
| APPLICATION NO. | : 11/203679 | |
| DATED | : January 12, 2010 | |
| INVENTOR(S) | : Eugene J. Vaatveit | |

It is certified that error appears in the above-identified patent and that said Letters Patent is hereby corrected as shown below:

In column 11, line 55, in Claim 11, after "or" insert -- a --.

In column 13, line 1, in Claim 17, delete "Identifying" and insert -- identifying --, therefor.

In column 14, line 4, in Claim 19, after "or" insert -- a --.

Signed and Sealed this

Eighth Day of February, 2011

David J. Kappos
*Director of the United States Patent and Trademark Office*